(12) United States Patent
Hwang et al.

(10) Patent No.: US 10,306,482 B2
(45) Date of Patent: May 28, 2019

(54) METHOD AND MTC DEVICE FOR PERFORMING RANDOM ACCESS PROCEDURE FOR COVERAGE ENHANCEMENT

(71) Applicant: LG ELECTRONICS INC., Seoul (KR)

(72) Inventors: Daesung Hwang, Seoul (KR); Joonkui Ahn, Seoul (KR); Suckchel Yang, Seoul (KR); Yunjung Yi, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/038,528

(22) PCT Filed: Dec. 1, 2014

(86) PCT No.: PCT/KR2014/011612
§ 371 (c)(1),
(2) Date: May 23, 2016

(87) PCT Pub. No.: WO2015/083997
PCT Pub. Date: Jun. 11, 2015

(65) Prior Publication Data
US 2016/0302080 A1    Oct. 13, 2016

Related U.S. Application Data

(60) Provisional application No. 61/930,465, filed on Jan. 22, 2014, provisional application No. 61/912,030, filed on Dec. 5, 2013.

(51) Int. Cl.
*H04J 3/06*         (2006.01)
*H04W 16/26*    (2009.01)
(Continued)

(52) U.S. Cl.
CPC .......... *H04W 16/26* (2013.01); *H04B 7/0413* (2013.01); *H04J 11/0076* (2013.01);
(Continued)

(58) Field of Classification Search
None
See application file for complete search history.

(56) References Cited

U.S. PATENT DOCUMENTS

2009/0305693 A1    12/2009 Shimomura et al.
2012/0077507 A1    3/2012 Lee
(Continued)

FOREIGN PATENT DOCUMENTS

CN    101569231 A    10/2009
CN    102067704 A    5/2011
(Continued)

OTHER PUBLICATIONS

U.S. Appl. No. 61/898,292; Li, "Coverage Enhancement for Machine Type of Communications".*
(Continued)

*Primary Examiner* — Kwang B Yao
*Assistant Examiner* — Juvena W Loo
(74) *Attorney, Agent, or Firm* — Birch, Stewart, Kolasch & Birch, LLP

(57) ABSTRACT

A disclosure of the present specification provides a method for performing a random access procedure for coverage enhancement. The method may comprise the steps of transmitting a random access preamble repetitively to a certain cell on the basis of a predetermined repetition level; when a random access response has not received within a random access response window, reconfiguring the repetition level; and retransmitting the random access preamble repetitively on the basis of the reconfigured repetition level.

12 Claims, 16 Drawing Sheets

(51) Int. Cl.

| | | |
|---|---|---|
| *H04W 4/70* | (2018.01) | |
| *H04W 74/08* | (2009.01) | |
| *H04L 1/18* | (2006.01) | |
| *H04B 7/0413* | (2017.01) | |
| *H04J 11/00* | (2006.01) | |
| *H04L 29/06* | (2006.01) | |
| *H04W 72/04* | (2009.01) | |
| *H04W 72/12* | (2009.01) | |
| *H04L 1/08* | (2006.01) | |
| *H04L 5/00* | (2006.01) | |

(52) U.S. Cl.
CPC ............. *H04L 1/08* (2013.01); *H04L 1/189* (2013.01); *H04L 69/28* (2013.01); *H04W 4/70* (2018.02); *H04W 72/0473* (2013.01); *H04W 72/1284* (2013.01); *H04W 72/1289* (2013.01); *H04W 74/08* (2013.01); *H04W 74/0833* (2013.01); *H04L 5/001* (2013.01)

(56) References Cited

U.S. PATENT DOCUMENTS

| | | | | |
|---|---|---|---|---|
| 2013/0035084 | A1* | 2/2013 | Song | H04W 74/0833 455/418 |
| 2015/0016312 | A1* | 1/2015 | Li | H04W 74/0833 370/280 |
| 2015/0023281 | A1* | 1/2015 | Wu | H04W 72/0473 370/329 |
| 2015/0117233 | A1* | 4/2015 | Wong | H04W 4/70 370/252 |
| 2016/0100431 | A1* | 4/2016 | Kishiyama | H04W 4/70 370/252 |
| 2016/0135147 | A1* | 5/2016 | Ouchi | H04W 52/146 370/329 |
| 2016/0242212 | A1* | 8/2016 | Wong | H04W 4/70 |
| 2016/0269163 | A1* | 9/2016 | Wong | H04L 5/0053 |

FOREIGN PATENT DOCUMENTS

| | | |
|---|---|---|
| CN | 102668683 B | 7/2014 |
| KR | 10-2009-0131650 A | 12/2009 |
| KR | 10-2012-0127643 A | 11/2012 |
| KR | 10-2013-0097782 A | 9/2013 |
| WO | WO 2013/142040 A1 | 9/2013 |
| WO | WO 2015/005701 A1 | 1/2015 |

OTHER PUBLICATIONS

U.S. Appl. No. 61/898,292.*

Huawei, HiSilicon "Determining the repetition level during initial random access and non-initial random access", R1-135382, 3GPP TSG RAN WG1 Meeting #75, San Francisco, USA, Nov. 11-15, 2013.

* cited by examiner

METHOD AND MTC DEVICE FOR PERFORMING RANDOM ACCESS PROCEDURE FOR COVERAGE ENHANCEMENT

CROSS REFERENCE TO RELATED APPLICATIONS

This application is the National Phase of PCT/KR2014/011612 filed on Dec. 1, 2014, which claims priority under 35 U.S.C. § 119(e) to U.S. Provisional Application Nos. 61/912,030 filed on Dec. 5, 2013; and 61/930,465 filed on Jan. 22, 2014, all of which are hereby expressly incorporated by reference into the present application.

BACKGROUND OF THE INVENTION

Field of the Invention

The present invention relates to wireless communication.

Related Art $3^{rd}$ generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) evolved from the 3GPP LTE.

As disclosed in 3GPP TS 36.211 V10.4.0 (2011-12) "Evolved Universal Terrestrial Radio Access (E-UTRA); Physical Channels and Modulation (Release 10)", 3GPP LTE/LTE-A may divide the physical channel into a downlink channel, i.e., a physical downlink shared channel (PDSCH) and a physical downlink control channel (PDCCH), and an uplink channel, i.e., a physical uplink shared channel (PUSCH) and a physical uplink control channel (PUCCH).

Meanwhile, in recent years, research into communication between devices or the device and a server without human interaction, that is, without human intervention, that is, machine-type communication (MTC) has been actively conducted. The MTC represents a concept in which not a terminal used by human but a machine performs communication by using the existing wireless communication network.

Since MTC has a feature different from communication of a normal UE, a service optimized to MTC may differ from a service optimized to human-to-human communication. In comparison with a current mobile network communication service, MTC can be characterized as a different market scenario, data communication, less costs and efforts, a potentially great number of MTC devices, wide service areas, low traffic for each MTC device, etc.

Recently, it is considered to extend cell coverage of a BS for an MTC device, and various schemes for extending cell coverage are under discussion. However, when the cell coverage is extended, if the BS transmits a downlink channel to the MTC device located in the coverage extension region as if transmitting a downlink channel to a normal UE, the MTC device has difficulty in receiving the channel. Likewise, when the MTC device located in the coverage extension region transmits an uplink channel to the BS in a usual way, the BS may have difficulty in receiving the uplink channel. In particular, the BS may have difficulty in receiving a physical random access channel (PRACH) among uplink channels due to characteristics thereof.

SUMMARY OF THE INVENTION

Accordingly, the disclosure of the specification has been made in an effort to solve the problem.

To achieve the foregoing aspect, a random access procedure performing method according to a first embodiment of the present invention is a method of performing a random access procedure for coverage enhancement, which may include repeatedly transmitting a random access preamble to a specific cell according to a preset repetition level, reconfiguring the repetition level based on a preset mode when no random access response (RAR) is received within an RAR window, and repeatedly retransmitting the random access preamble according to the reconfigured repetition level.

The preset mode may be a mode of configuring the repetition level to be an initial repetition level, in which the initial repetition level may be a possible lowest repetition level or a repetition level selected based on a measurement by a user equipment (UE) or machine-type communication (MTC) device.

The preset mode may be a mode of increasing the preset repetition level by one.

The preset mode may be a mode of increasing the preset repetition level by one when preamble transmission power $P_{PRACH}$ is configured UE transmission power.

The preset mode may be a mode of increasing the preset repetition level by one when preamble transmission power $P_{PRACH}$ at a time of performing power ramping is configured UE transmission power or greater.

The preset mode may be a mode of reconfiguring the repetition level based on total PRACH power, in which the total PRACH power may be total power for subframes corresponding to the repeatedly transmitted random access preamble.

The preset mode may be a mode of reconfiguring the repetition level according to repetition level information included in a PDCCH order when the random access procedure starts according to the PDCCH order.

To achieve the foregoing aspect, a method of performing a random access procedure according to a second embodiment of the present invention may further include transmitting message 3 (Msg 3) when an RAR is received, reconfiguring a preset repetition level based on an additional preset mode when no message 4 (Msg 4) is received until a contention resolution timer expires, and repeatedly retransmitting the random access preamble according to the repetition level reconfigured based on the additional preset mode.

The additional preset mode may be a mode of maintaining the preset repetition level in a case where the received RAR includes a backoff indicator, and increasing the preset repetition level in a case where the received RAR includes no backoff indicator.

The additional preset mode may be a mode of configuring the preset repetition level to be a repetition level corresponding to message 3, in which the repetition level corresponding to message 3 may be an initial repetition level or a repetition level corresponding to a random access preamble successfully transmitted through retransmission before message 3, and the initial repetition level may be a possible lowest repetition level or a repetition level selected based on a measurement by a UE or MTC device.

The received RAR may include a repetition level field, and the additional preset mode may be a mode of reconfiguring the preset repetition level according to the repetition level field.

The additional preset mode may be a mode of selecting and performing one involving smaller total RACH power of power ramping and a change of the preset repetition level, in which the total PRACH power may be total power for subframes corresponding to the repeatedly transmitted random access preamble.

The additional preset mode may be a mode of reconfiguring the preset repetition level according to repetition level information included in a PDCCH order when the random access procedure starts according to the PDCCH order.

To achieve the foregoing aspect, an MTC device according to an embodiment of the present invention is an MTC device performing a random access procedure for coverage enhancement, which may include a transceiver to repeatedly transmit a random access preamble to a specific cell according to a preset repetition level, and a processor to reconfigure the repetition level when no RAR is received within an RAR window and to control the transceiver to repeatedly retransmit the random access preamble according to the reconfigured repetition level.

The transceiver may transmit message 3 (Msg 3) when an RAR is received, and the processor may reconfigure the preset repetition level based on an additional preset mode when no message 4 (Msg 4) is received until a contention resolution timer expires, and control the transceiver to repeatedly retransmit the random access preamble according to the reconfigured repetition level.

Embodiments of the present invention are provided to solve the foregoing problems of the conventional technology. Specifically, embodiments of the present invention may improve reception performance and decoding performance of an MTC device located in a coverage extension region of an eNodeB with respect to the eNodeB, thereby implementing a random access procedure in an efficient and excellent manner.

DESCRIPTION OF EXEMPLARY EMBODIMENTS

Figure 1:
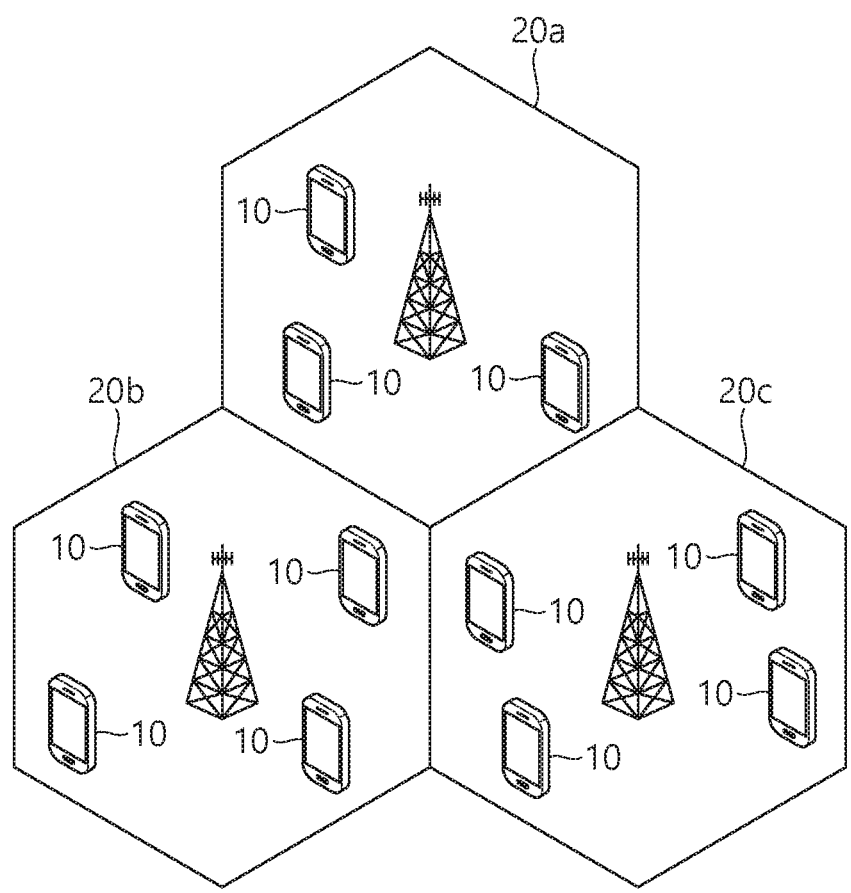
FIG. 1 illustrates a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present invention includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present invention, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, 'user equipment (UE)' may be stationary or mobile, and may be denoted by other terms such as device, wireless device, terminal, MS (mobile station), UT (user terminal), SS (subscriber station), MT (mobile terminal) and etc.

FIG. 1 illustrates a wireless communication system.

As seen with reference to FIG. 1, the wireless communication system includes at least one base station (BS) 20. Each base station 20 provides a communication service to specific geographical areas (generally, referred to as cells) 20a, 20b, and 20c. The cell can be further divided into a plurality of areas (sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE1 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

Hereinafter, the LTE system will be described in detail.

Figure 2:
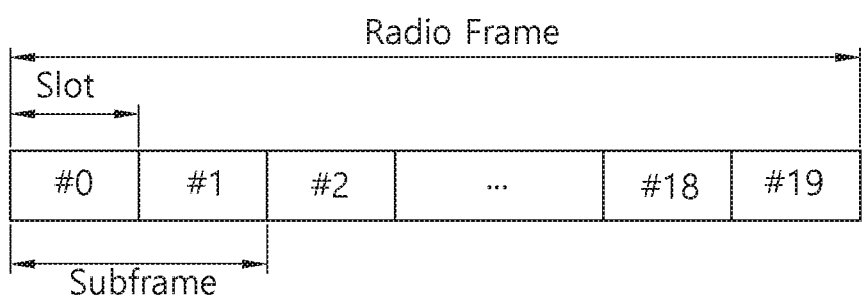
FIG. 2 illustrates a structure of a radio frame according to frequency division duplex (FDD) of 3rd generation partnership project (3GPP) long term evolution (LTE).

FIG. 2 illustrates a structure of a radio frame according to FDD of 3rd generation partnership project (3GPP) long term evolution (LTE).

The radio frame of FIG. 2 may be found in the section 5 of 3GPP TS 36.211 V10.4.0 (2011-12) "Evolved Universal Terrestrial Radio Access (E-UTRA); Physical Channels and Modulation (Release 10)".

The radio frame includes 10 subframes indexed 0 to 9. One subframe includes two consecutive slots. Accordingly, the radio frame includes 20 slots. The time taken for one subframe to be transmitted is denoted TTI (transmission time interval). For example, the length of one subframe may be 1 ms, and the length of one slot may be 0.5 ms.

The structure of the radio frame is for exemplary purposes only, and thus the number of subframes included in the radio frame or the number of slots included in the subframe may change variously.

Meanwhile, one slot may include a plurality of OFDM symbols. The number of OFDM symbols included in one slot may vary depending on a cyclic prefix (CP).

Figure 3:
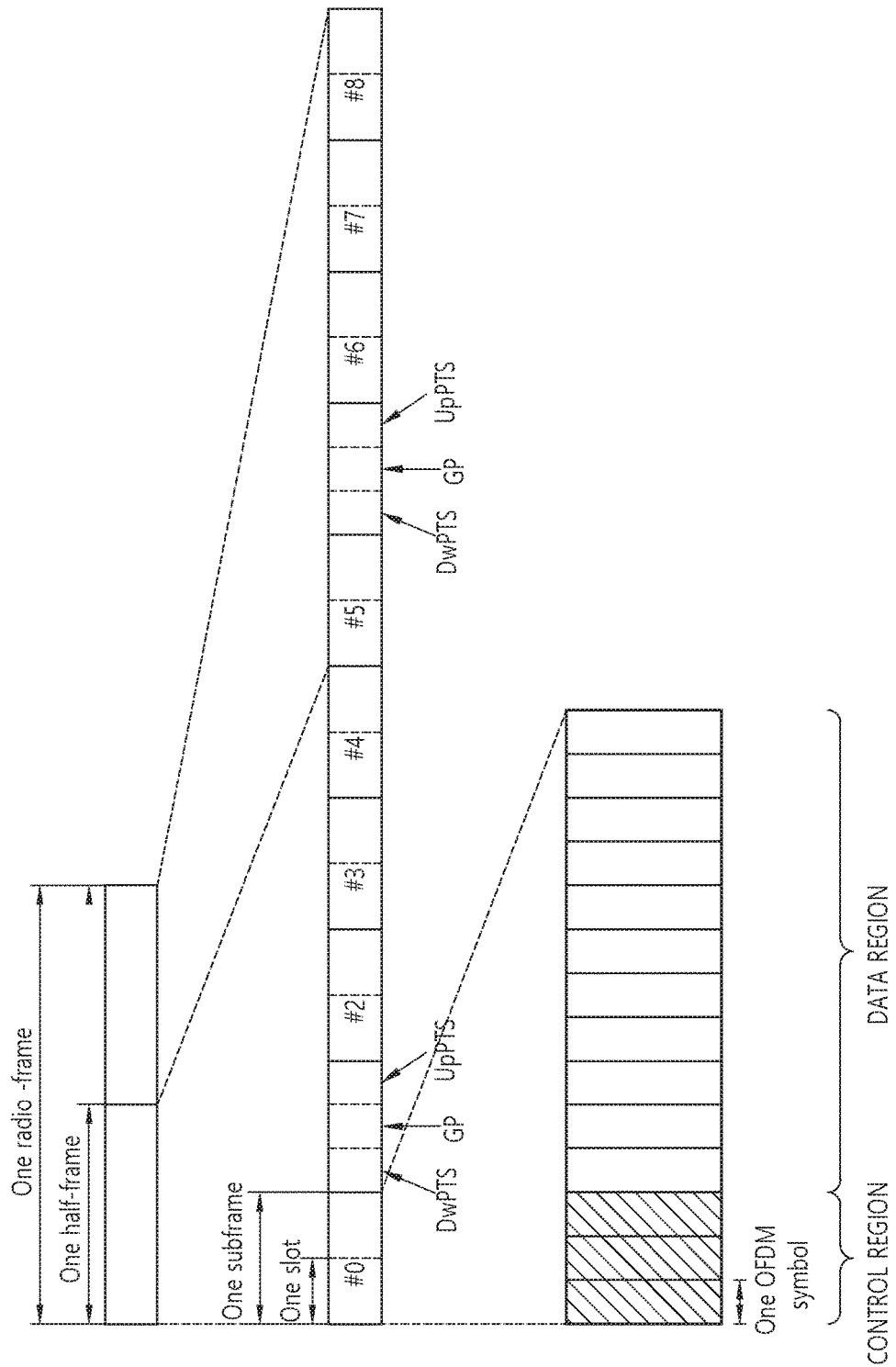
FIG. 3 illustrates a structure of a downlink radio frame according to time division duplex (TDD) in 3GPP LTE.

FIG. 3 illustrates a structure of a downlink radio frame according to TDD in 3GPP LTE.

For this, 3GPP TS 36.211 V10.4.0 (2011-23) "Evolved Universal Terrestrial Radio Access (E-UTRA); Physical Channels and Modulation (Release 8)", Ch. 4 may be referenced, and this is for TDD (time division duplex).

Subframes having index #1 and index #6 are denoted special subframes, and include a DwPTS (Downlink Pilot Time Slot: DwPTS), a GP (Guard Period) and an UpPTS (Uplink Pilot Time Slot). The DwPTS is used for initial cell search, synchronization, or channel estimation in a terminal. The UpPTS is used for channel estimation in the base station and for establishing uplink transmission sync of the terminal. The GP is a period for removing interference that arises on uplink due to a multi-path delay of a downlink signal between uplink and downlink.

In TDD, a DL (downlink) subframe and a UL (Uplink) co-exist in one radio frame. Table 1 shows an example of configuration of a radio frame.

TABLE 1

| UL-DL config-uration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL subframe, 'U' a UL subframe, and 'S' a special subframe. When receiving a UL-DL configuration from the base station, the terminal may be aware of whether a subframe is a DL subframe or a UL subframe according to the configuration of the radio frame.

Figure 4:
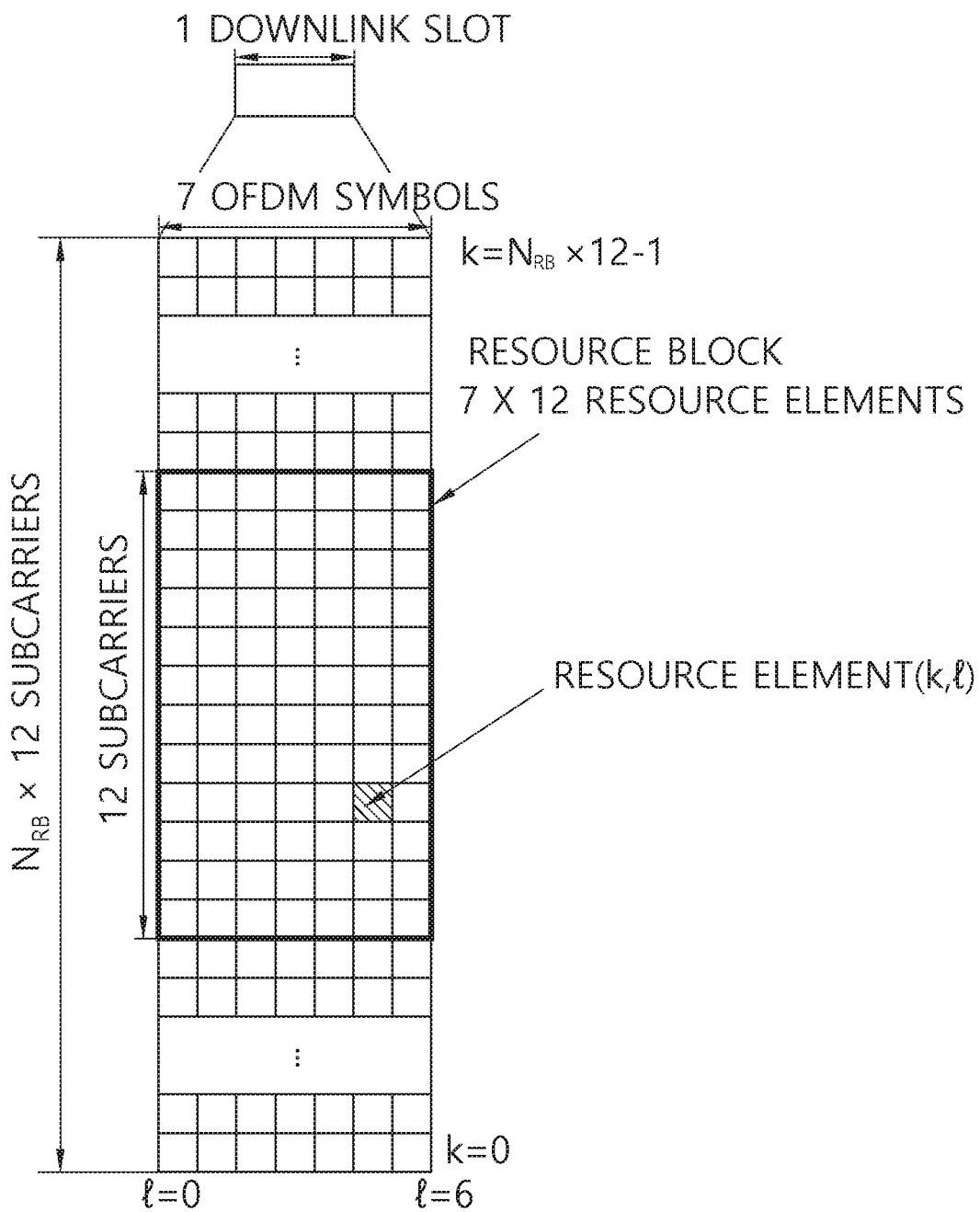
FIG. 4 illustrates an example of a resource grid for one uplink or downlink slot in 3GPP LTE.

FIG. 4 illustrates an example of a resource grid for one uplink or downlink slot in 3GPP LTE.

Referring to FIG. 4, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., NRB, may be one from 6 to 110.

The resource block is a unit of resource allocation and includes a plurality of sub-carriers in the frequency domain. For example, if one slot includes seven OFDM symbols in the time domain and the resource block includes 12 sub-carriers in the frequency domain, one resource block may include 7×12 resource elements (REs).

Figure 5:
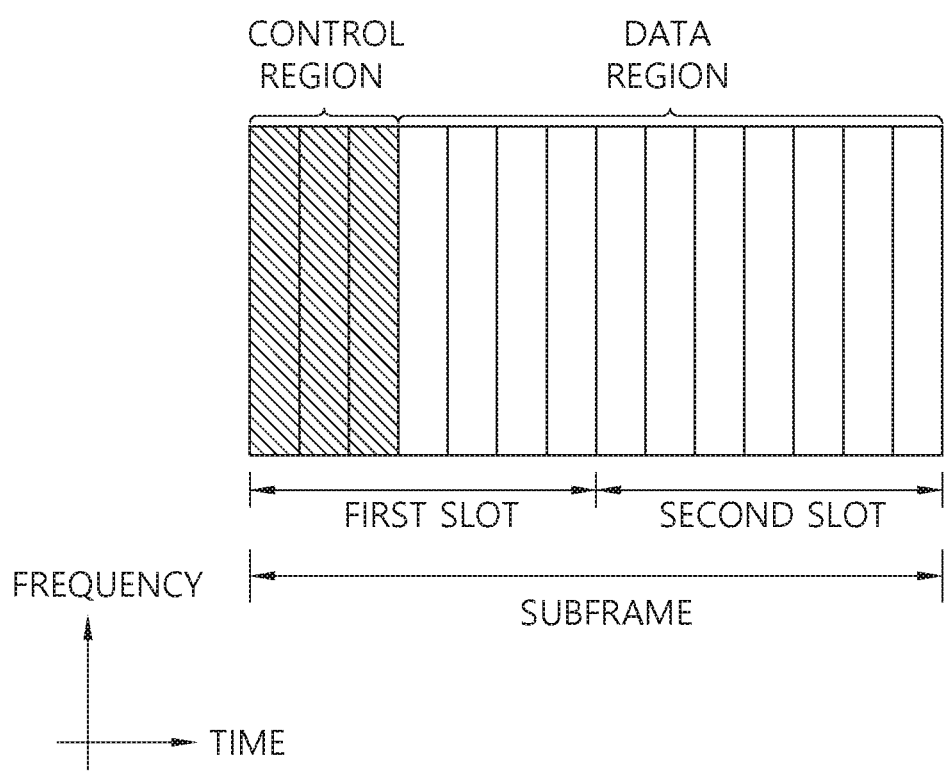
FIG. 5 illustrates a structure of a downlink subframe.

FIG. 5 illustrates a structure of a downlink subframe.

In FIG. 5, assuming the normal CP, one slot includes seven OFDM symbols, by way of example.

The DL (downlink) subframe is split into a control region and a data region in the time domain. The control region includes up to first three OFDM symbols in the first slot of the subframe. However, the number of OFDM symbols included in the control region may be changed. A PDCCH (physical downlink control channel) and other control channels are assigned to the control region, and a PDSCH is assigned to the data region.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the subframe carries CIF (control format indicator) regarding the number (i.e., size of the control region) of OFDM symbols used for transmission of control channels in the subframe. The wireless device first receives the CIF on the PCFICH and then monitors the PDCCH.

Unlike the PDCCH, the PCFICH is transmitted through a fixed PCFICH resource in the subframe without using blind decoding.

The PHICH carries an ACK (positive-acknowledgement)/ NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first subframe of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The PDCCH may carry activation of VoIP (voice over Internet protocol) and a set of transmission power control commands for individual UEs in some UE group, resource allocation of an upper layer control message such as a random access response transmitted on the PDSCH, system information on DL-SCH, paging information on PCH, resource allocation information of UL-SCH (uplink shared channel), and resource allocation and transmission format of DL-SCH (downlink-shared channel). A plurality of PDCCHs may be sent in the control region, and the terminal may monitor the plurality of PDCCHs. The PDCCH is transmitted on one CCE (control channel element) or aggregation of some consecutive CCEs. The CCE is a logical allocation unit used for providing a coding rate per radio channel's state to the PDCCH. The CCE corresponds to a plurality of resource element groups. Depending on the relationship between the number of CCEs and coding rates provided by the CCEs, the format of the PDCCH and the possible number of PDCCHs are determined.

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

The base station determines a PDCCH format according to the DCI to be sent to the terminal and adds a CRC (cyclic redundancy check) to control information. The CRC is masked with a unique identifier (RNTI; radio network temporary identifier) depending on the owner or purpose of the PDCCH. In case the PDCCH is for a specific terminal, the terminal's unique identifier, such as C-RNTI (cell-RNTI), may be masked to the CRC. Or, if the PDCCH is for a paging message, a paging indicator, for example, P-RNTI (paging-RNTI) may be masked to the CRC. If the PDCCH is for a system information block (SIB), a system information identifier, SI-RNTI (system information-RNTI), may be masked to the CRC. In order to indicate a random access response that is a response to the terminal's transmission of a random access preamble, an RA-RNTI (random access-RNTI) may be masked to the CRC.

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

A control region in a subframe includes a plurality of control channel elements (CCEs). The CCE is a logical allocation unit used to provide the PDCCH with a coding rate depending on a radio channel state, and corresponds to a plurality of resource element groups (REGs). The REG includes a plurality of resource elements. According to an association relation of the number of CCEs and the coding rate provided by the CCEs, a PDCCH format and the number of bits of an available PDCCH are determined.

One REG includes 4 REs. One CCE includes 9 REGs. The number of CCEs used to configure one PDCCH may be selected from a set {1, 2, 4, 8}. Each element of the set {1, 2, 4, 8} is referred to as a CCE aggregation level.

The BS determines the number of CCEs used in transmission of the PDCCH according to a channel state. For example, a wireless device having a good DL channel state can use one CCE in PDCCH transmission. A wireless device having a poor DL channel state can use 8 CCEs in PDCCH transmission.

A control channel consisting of one or more CCEs performs interleaving on an REG basis, and is mapped to a physical resource after performing cyclic shift based on a cell identifier (ID).

Meanwhile, a UE is unable to know that the PDCCH of its own is transmitted on which position within control region and using which CCE aggregation level or DCI format. Since a plurality of PDCCHs may be transmitted in one subframe, the UE monitors a plurality of PDCCHs in every subframe. Here, the monitoring is referred to try to decode the PDCCH by the UE according to the PDCCH format.

In 3GPP LTE, in order to decrease the load owing to the blind decoding, a search space is used. The search space may be referred to a monitoring set of CCE for the PDCCH. The UE monitors the PDCCH within the corresponding search space.

When a UE monitors the PDCCH based on the C-RNTI, the DCI format and the search space which is to be monitored are determined according to the transmission mode of the PDSCH. The table below represents an example of the PDCCH monitoring in which the C-RNTI is setup.

TABLE 2

| Transmission mode | DCI format | Search space | Transmission mode of PDSCH according to PDCCH |
|---|---|---|---|
| Transmission mode 1 | DCI format 1A | Public service and terminal specific | Single antenna port, port 0 |
| | DCI format 1 | Terminal specific | Single antenna port, port 0 |
| Transmission mode 2 | DCI format 1A | Public service and terminal specific | Transmit diversity |
| | DCI format 1 | Terminal specific | Transmit diversity |
| Transmission mode 3 | DCI format 1A | Public service and terminal specific | Transmit diversity |
| | DCI format 2A | Terminal specific | CDD(Cyclic Delay Diversity) or transmit diversity |
| Transmission mode 4 | DCI format 1A | Public service and terminal specific | Transmit diversity |
| | DCI format 2 | Terminal specific | Closed-loop spatial multiplexing |
| Transmission mode 5 | DCI format 1A | Public service and terminal specific | Transmit diversity |
| | DCI format 1D | Terminal specific | MU-MIMO(Multi-user Multiple Input Multiple Output) |
| Transmission mode 6 | DCI format 1A | Public service and terminal specific | Transmit diversity |
| | DCI format 1B | Terminal specific | Closed-loop spatial multiplexing |
| Transmission mode 7 | DCI format 1A | Public service and terminal specific | If the number of PBCH transmisison ports is 1, single antenna port, port 0. Otherwise, transmit diversity |
| | DCI format 1 | Terminal specific | Single antenna port, port 5 |
| Transmission mode 8 | DCI format 1A | Public service and terminal specific | If the number of PBCH transmisison ports is 1, single antenna port, port 0. Otherwise, transmit diversity |
| | DCI format 2B | Terminal specific | Dual layer transmisison (port 7 or 8), or single antenna port, port 7 or 8 |
| Transmission mode 9 | DCI format 1A | Public service and terminal specific | Non-MBSFN subframe: if the number of PBCH antenna ports is 1, port 0 is used as independent antenna port. Otherwise, transmit Diversity<br>MBSFN subframe: port 7 as independent antenna port |
| | DCI format 2C | Terminal specific | 8 transmisison layers, ports 7-14 are used or port 7 or 8 is used as independent antenna port |
| Transmission mode 10 | DCI 1A | Public service and terminal specific | Non-MBSFN subframe: if the number of PBCH antenna ports is 1, port 0 is used as independent antenna port. Otherwise, transmit Diversity<br>MBSFN subframe: port 7 as independent antenna port |
| | DCI format 2D | Terminal specific | 8 transmisison layers, ports 7-14 are used or port 7 or 8 is used as independent antenna port |

The usage of the DCI format is classified as shown in Table 3 below.

TABLE 3

| DCI format | Contents |
|---|---|
| DCI format 0 | Used in PUSCH scheduling |
| DCI format 1 | Used in scheduling of one PDSCH codeword |
| DCI format 1A | Used in compact scheduling of one PDSCH codeword and random access process |
| DCI format 1B | Used in compact scheduling of one PDSCH codeword having precoding information |
| DCI format 1C | Used in very compact scheduling of one PDSCH codeword |
| DCI format 1D | Used in precoding and compact scheduling of one PDSCH codeword having power offset information |
| DCI format 2 | Used in PDSCH scheduling of terminals configured in closed-loop spatial multiplexing mode |
| DCI format 2A | Used in PDSCH scheduling of terminals configured in open-loop spatial multiplexing mode |

TABLE 3-continued

| DCI format | Contents |
|---|---|
| DCI format 2B | DCI format 2B is used for resouce allocation for dual-layer beam-forming of PDSCH. |
| DCI format 2C | DCI format 2C is used for resouce allocation for closed-loop SU-MIMO or MU-MIMO operation to 8 layers. |
| DCI format 2D | DCI format 2C is used for resouce allocation to 8 layers. |
| DCI format 3 | Used to transmit TPC command of PUCCH and PUSCH having 2 bit power adjustments |
| DCI format 3A | Used to transmit TPC command of PUCCH and PUSCH having 1 bit power adjustment |
| DCI format 4 | Used in PUSCH scheduling of uplink (UP) operated in multi-antenna port transmisison mode |

For example, DCI format 0 includes fields listed in the following table with reference to section 5.3.311 of 3GPP TS 36.212 V10.2.0 (2011-06)

TABLE 4

| Field | Number of bits |
|---|---|
| Carrier indicator | 0 or 3 bits |
| Flag for format0/format1A differentiation | 1 bit |
| FH(Frequency hopping) flag | 1 bit |
| Resource block assignment and hopping resource allocation | |
| MCS(Modulation and coding scheme) and RV (redundancy version) | 5 bits |
| NDI(New data indicator) | 1 bit |
| TPC | 2 bits |
| Cyclic shift for DM RS and OCC index | 3 bits |
| UL index | 2 bits |
| DAI(Downlink Assignment Index) | 2 bit |
| CSI request | 1 or 2 bits |
| SRS request | 0 or 1 bits |
| Resource allocation type | 1 bit |

Figure 6:
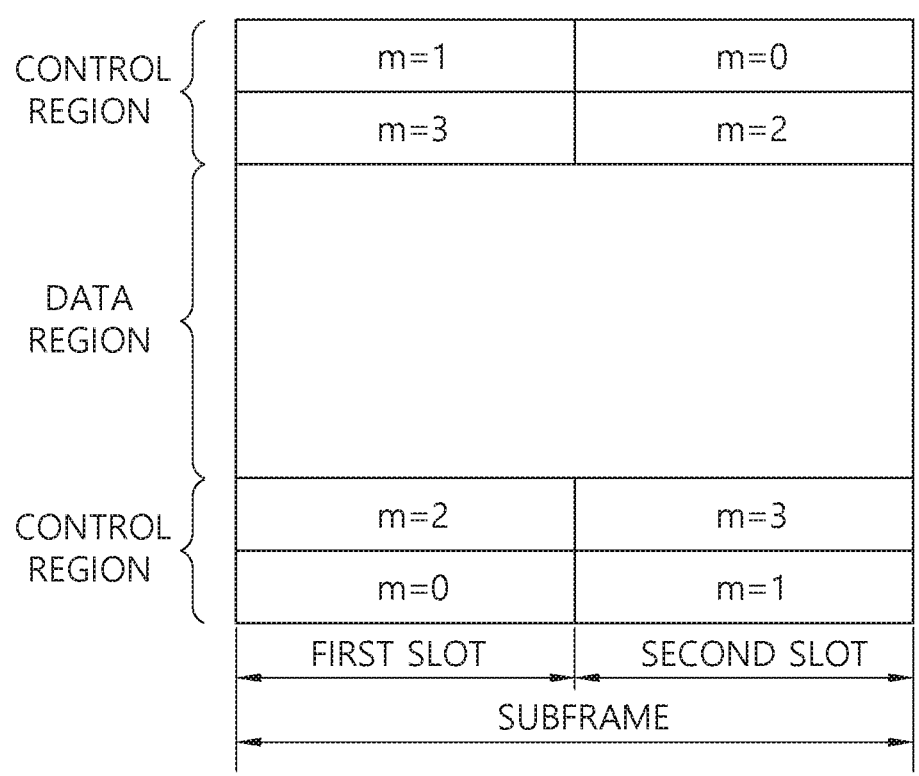
FIG. 6. illustrates a structure of an uplink subframe in 3GPP LTE.

FIG. 6. illustrates a structure of an uplink subframe in 3GPP LTE.

Referring to FIG. 6, an uplink subframe may be divided into a control region and a data region in a frequency domain. The control region is allocated a PUCCH for transmission of uplink control information. The data region is allocated a PUSCH for transmission of data (along with control information in some cases).

A PUCCH for one UE is allocated a RB pair in a subframe. RBs in the RB pair take up different subcarriers in each of first and second slots. A frequency occupied by the RBs in the RB pair allocated to the PUCCH changes with respect to a slot boundary, which is described as the RB pair allocated to the PUCCH having been frequency-hopped on the slot boundary.

A UE transmits uplink control information through different subcarriers according to time, thereby obtaining a frequency diversity gain. m is a location index indicating the logical frequency-domain location of an RB pair allocated for a PUCCH in a subframe.

Uplink control information transmitted on a PUCCH may include a HARQ ACK/NACK, a channel quality indicator (CQI) indicating the state of a downlink channel, a scheduling request (SR) which is an uplink radio resource allocation request, or the like.

A PUSCH is mapped to a uplink shared channel (UL-SCH) as a transport channel. Uplink data transmitted on a PUSCH may be a transport block as a data block for a UL-SCH transmitted during a TTI. The transport block may be user information. Alternatively, the uplink data may be multiplexed data. The multiplexed data may be the transport block for the UL-SCH multiplexed with control information. For example, control information multiplexed with data may include a CQI, a precoding matrix indicator (PMI), an HARQ, a rank indicator (RI), or the like. Alternatively, the uplink data may include only control information.

A carrier aggregation system is described hereinafter.

A carrier aggregation system aggregates a plurality of component carriers (CCs). A conventional definition of a cell is changed according to carrier aggregation. According to carrier aggregation, a cell may denote a combination of a downlink component carrier and an uplink component carrier or a downlink component carrier alone.

Further, in carrier aggregation, cells may be divided into a primary cell, a secondary cell, and a serving cell. A primary cell denotes a cell operating at a primary frequency, in which a UE performs an initial connection establishment procedure or a connection reestablishment procedure with a BS or which is designated as a primary cell in a handover procedure. A secondary cell denotes a cell operating at a secondary frequency, which is configured once RRC connection is established and is used to provide an additional radio resource.

As described above, the carrier aggregation system may support a plurality of component carriers (CCs), that is, a plurality of serving cells, unlike a single carrier system.

The carrier aggregation system may support cross-carrier scheduling. Cross-carrier scheduling is a scheduling method for performing resource allocation for a PDSCH transmitted through a different component carrier through a PDCCH transmitted through a specific component carrier and/or resource allocation for a PUSCH transmitted through a component carrier different from a component carrier basically linked with the specific component carrier.

Figure 7:
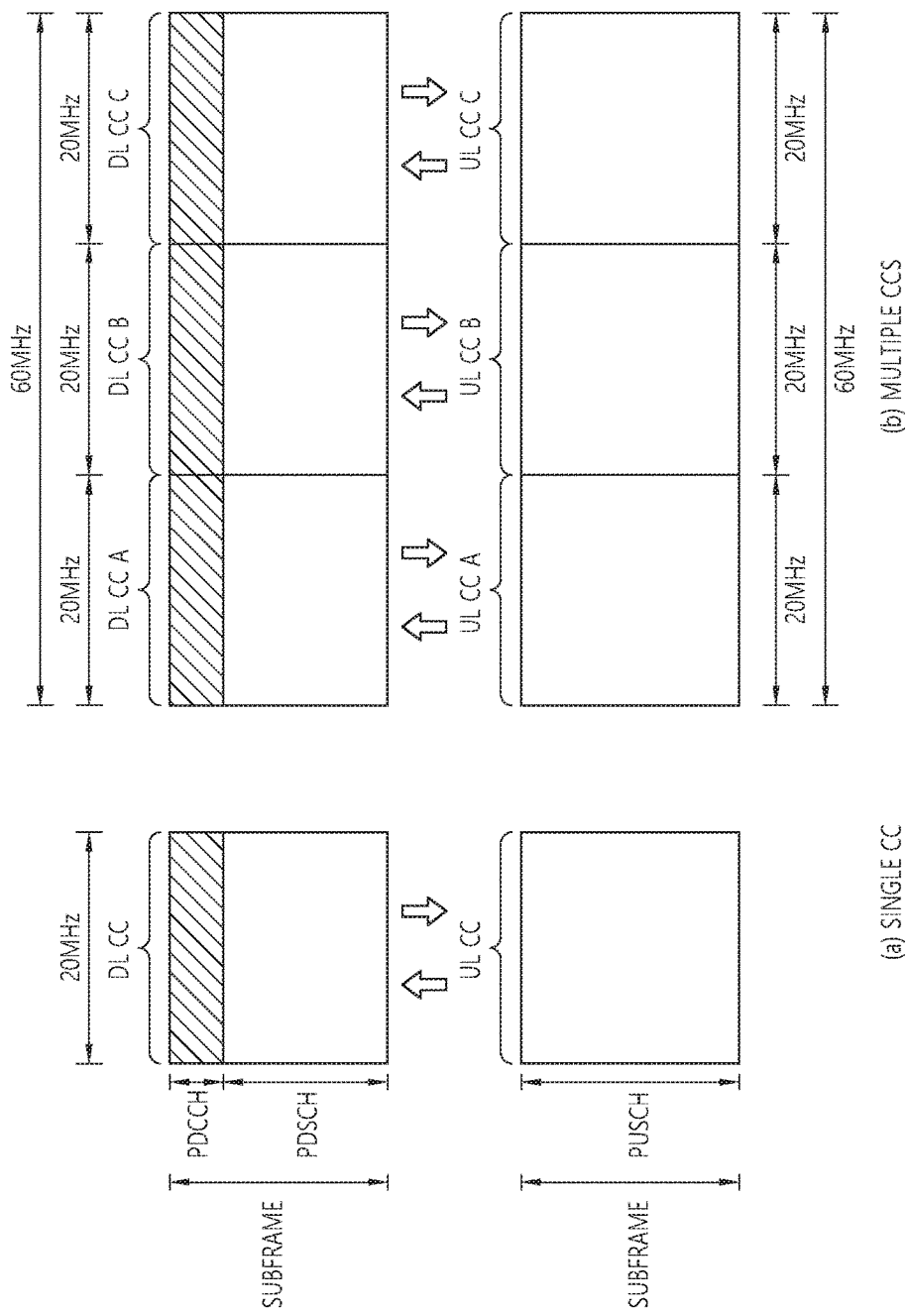
FIG. 7 illustrates an example of comparison between a single carrier system and a carrier aggregation system.

FIG. 7 illustrates an example of comparison between a single carrier system and a carrier aggregation system.

Referring to (a) of FIG. 7, the single carrier system supports only one carrier for an uplink and a downlink for a UE. Although there may be various bandwidths of carriers, a UE is assigned one carrier. Referring to (b) of FIG. 7, the carrier aggregation (CA) system may assign a plurality of component carriers (DL CC A to C and UL CC A to C) for a UE. A component carrier (CC) denotes a carrier used in the carrier aggregation system and may be abbreviated to a carrier. For example, three 20-MHz component carriers may be assigned to allocate a 60-MHz bandwidth for the terminal.

Carrier aggregation systems may be divided into a contiguous carrier aggregation system in which aggregated carriers are contiguous and a non-contiguous carrier aggregation system in which aggregated carriers are spaced apart from each other. Hereinafter, when simply referring to a carrier aggregation system, it should be understood as including both a case where component carriers are contiguous and a case where component carriers are non-contiguous. Different numbers of component carriers may be aggregated for a downlink and an uplink. A case where the number of downlink component carriers and the number of uplink component carriers are the same is referred to as symmetric aggregation, and a case where the numbers are different is referred to as asymmetric aggregation.

When one or more component carriers are aggregated, component carriers to be aggregated may use the same bandwidths as adopted in an existing system for backward compatibility with the existing system. For example, the 3GPP LTE system supports bandwidths of 1.4 MHz, 3 MHz, 5 MHz, 10 MHz, 15 MHz, and 20 MHz, and the 3GPP LTE-A system may configure a broad band of 20 MHz or more only using the bandwidths of the 3GPP LTE system. Alternatively, instead of using the bandwidths of the existing system, new bandwidths may be defined to configure a broad band.

In order to transmit/receive packet data through a specific secondary cell in carrier aggregation, a UE first needs to complete configuration for the specific secondary cell. Here, configuration means that reception of system information necessary for data transmission/reception in a cell is completed. For example, configuration may include an overall process of receiving common physical-layer parameters necessary for data transmission and reception, media access control (MAC)-layer parameters, or parameters necessary for a specific operation in an RRC layer. A configuration-completed cell is in a state where packet transmission and reception is immediately possible upon receiving information indicating packet data may be transmitted.

A configuration-completed cell may be in an activated or deactivated state. Here, the activated state means that the cell performs data transmission or reception or is ready for data transmission or reception. A UE may monitor or receive a control channel (PDCCH) and a data channel (PDSCH) of an activated cell in order to identify resources (which may be a frequency or time) assigned thereto.

The deactivated state means that transmission or reception of traffic data is impossible and measurement or transmission/reception of minimal information is possible. A UE may receive system information (SI) necessary for receiving a packet from a deactivated cell. However, the UE does not monitor or receive a control channel (PDCCH) and data channel (PDSCH) of the deactivated cell in order to identify resources (which may be a frequency or time) assigned thereto.

Figure 8:
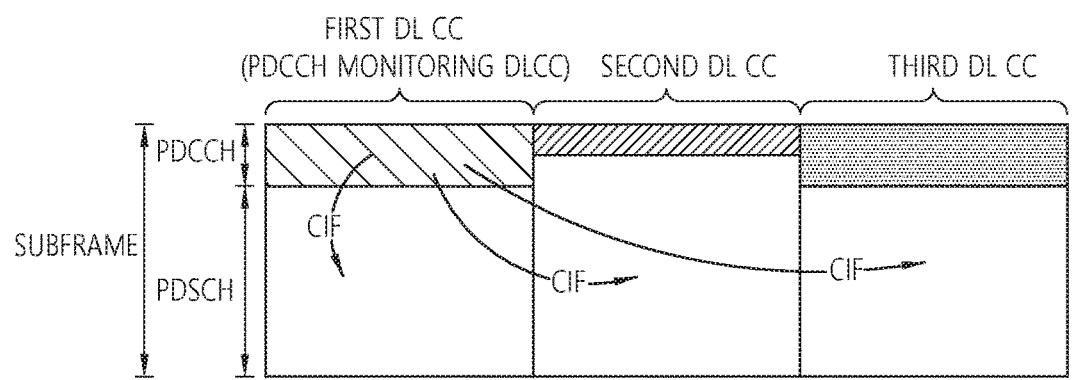
FIG. 8 illustrates cross-carrier scheduling in a carrier aggregation system.

FIG. 8 illustrates cross-carrier scheduling in a carrier aggregation system.

Referring to FIG. 8, a BS may configure a PDCCH monitoring DL CC (monitoring CC) set. The PDCCH monitoring DL CC set includes some of all aggregated DL CCs, and a UE performs PDCCH monitoring/decoding only on a DL CC included in the PDCCH monitoring DL CC set when cross-carrier scheduling is configured. That is, the BS transmits a PDCCH with respect to a PDSCH/PUSCH to be scheduled only through a DL CC included in the PDCCH monitoring DL CC set. The PDCCH monitoring DL CC set may be configured to be UE-specific, UE group-specific, or cell-specific.

FIG. 8 illustrates an example in which three DL CCs (DL CC A, DL CC B, and DL CC C) are aggregated and DL CC A is set as a PDCCH monitoring DL CC. A UE may receive a DL grant with respect to a PDSCH of DL CC A, DL CC B, and DL CC C through a PDCCH of DL CC A. DCI transmitted through the PDCCH of DL CC A includes a CIF to indicate which DL CC the DCI is about.

Hereinafter, a general random access procedure will be described. A random access procedure is used by a UE to achieve uplink synchronization with a BS or to be assigned an uplink radio resource. A random access procedure may be divided into contention-based random access and contention-free or non-contention-based random access.

Figure 9A:
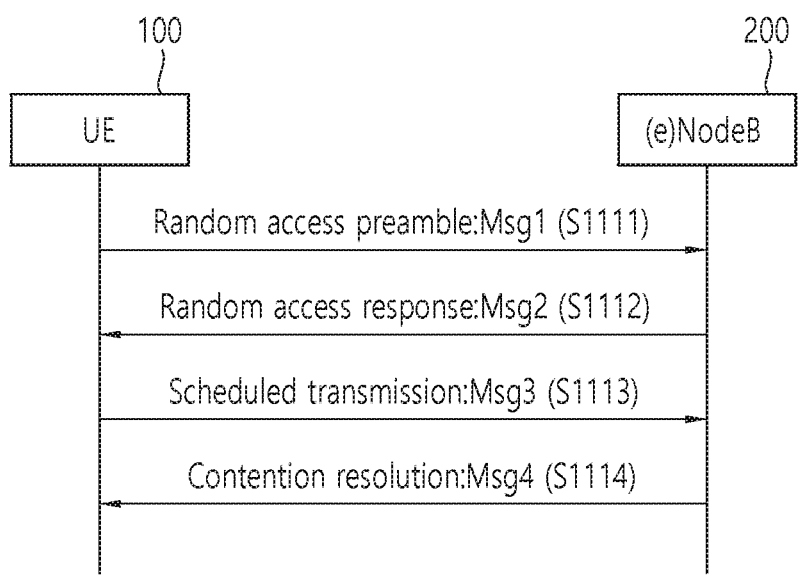
FIG. 9a illustrates a contention-based random access procedure.

FIG. 9*a* illustrates a contention-based random access procedure.

Referring to FIG. 9*a*, a UE 100 randomly selects one random access preamble in a random access preamble set indicated through system information or a handover command. The UE 100 selects a radio resource for transmitting the random access preamble to transmit the selected random access preamble (message 1: Msg 1, S1111). The radio resource may be a specific subframe, and selecting the radio resource may be selecting a physical random access channel (PRACH).

After transmitting the random access preamble, the UE 100 attempts to receive a random access response (RAR) within an RAR window indicated through the system information or handover command and accordingly receives an RAR (message 2: Msg 2, S1112). The RAR may be transmitted in a MAC protocol data unit (PDU) format.

The RAR may include a random access preamble identifier (ID), a UL grant (uplink radio resource), a temporary cell-radio network temporary identifier (C-RNTI), and a synchronization adjustment command (for example, a timing advance command (TAC)). Since one RAR may include RAR information for one or more UEs 100, a random access preamble ID may be included to indicate a UE 100 for which a UL grant, a temporary C-RNTI, and a synchronization adjustment command (for example, a TAC) are valid. The random access preamble ID may be an ID of a random access preamble received by an eNodeB 200. The synchronization adjustment command (for example, a TAC) may be included as information for the UE 100 to adjust uplink synchronization. The RAR may be indicated by a random access ID on a PDCCH, that is, a random access-radio network temporary identifier (RA-RNTI).

When the UE 100 receives the RAR valid therefor, the UE 100 processes information included in the RAR and performs scheduled transmission (message 3: Msg 3) to the eNodeB 200. That is, the UE 100 applies the synchronization adjustment command (for example, a TAC) and stores the temporary C-RNTI. Further, the UE 100 transmits data stored in a buffer of the UE 100 or newly generated data to the eNodeB 200 using the UL grant. In this case, information to identify the UE 100 needs to be included, which is for identifying the UE 100 in order to avoid contention since the eNodeB 200 does not judge which UEs 100 perform random access in the contention-based random access procedure.

The UE 100 transmits a scheduled message (that is, Msg 3) including an ID of the UE 100 through a radio resource assigned through the UL grant included in the RAR and waits for an instruction (message 4: Msg 4) from the eNodeB 200 to avoid contention (S1114). That is, the UE 100 attempts to receive a PDCCH in order to a specific message.

Figure 9B:
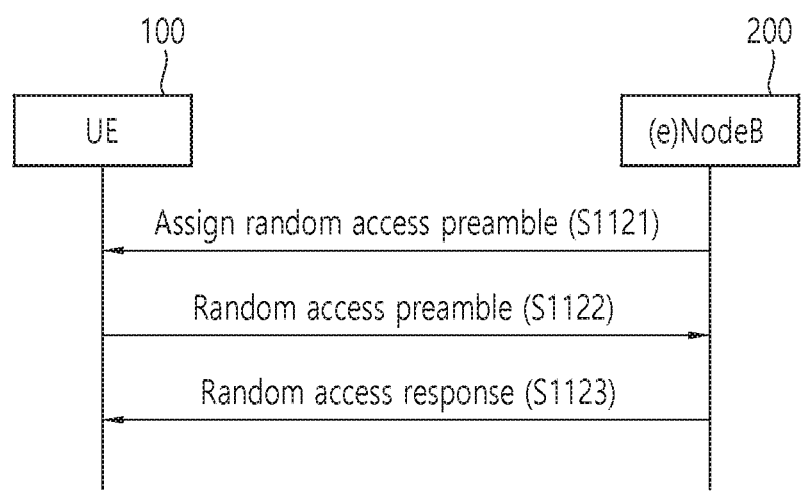
FIG. 9b illustrates a non-contention-based random access procedure.

FIG. 9*b* illustrates a non-contention-based random access procedure.

Unlike contention-based random access, non-contention-based random access may be finished when a UE 100 receives an RAR.

Non-contention-based random access may be initiated by a request, such as a handover and/or a command from an eNodeB 200. Here, in the foregoing two cases, contention-based random access may also be performed.

The UE 100 is assigned by the eNodeB 200 a designated random access preamble having no possibility of contention. The random access preamble may be assigned through a handover command and a PDCCH command (S1121).

After being assigned the random access preamble designated for the UE 100, the UE 100 transmits the random access preamble to the eNodeB 200 (S1122).

When the random access preamble us received, the eNodeB 200 transmits an RAR to the UE 100 in response (S1123).

Hereinafter, machine-type communication (MTC) will be described.

Figure 10A:
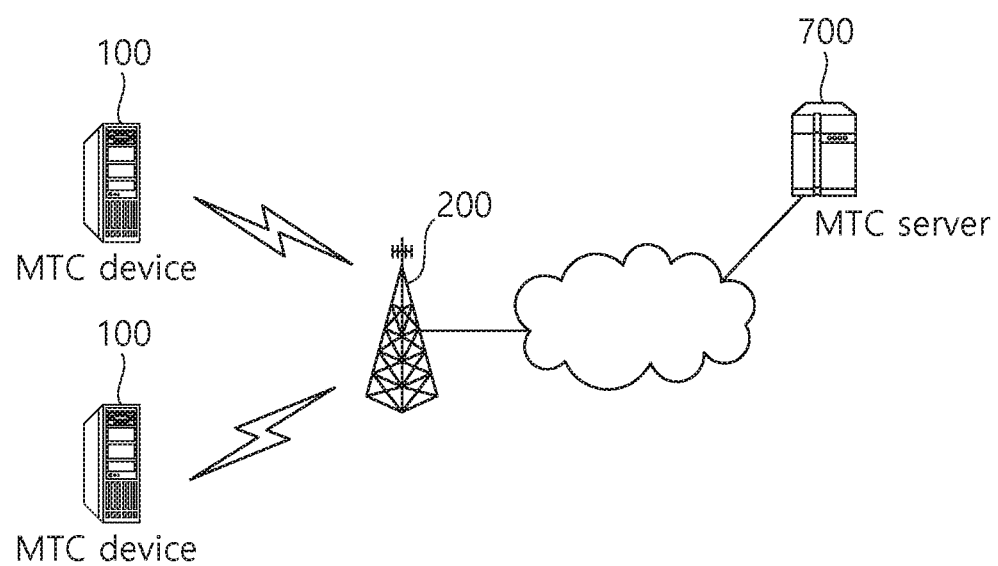
FIG. 10a illustrates an example of machine-type communication (MTC).

FIG. 10a illustrates an example of MTC.

MTC refers to an information exchange between MTC devices 100 via a BS 200 or information exchange between an MTC device 100 and an MTC server 700 via a BS without involving human interactions.

The MTC server 700 is an entity to communicate with the MTC device 100. The MTC server 700 runs an MTC application and provides the MTC device with an MTC-specific service.

The MTC device 100 is a wireless device to provide MTC communication, which may be stationary or mobile.

Services provided through MTC are differentiated from existing communication services involving human intervention and an MTC service range is wide, for example, tracking, metering, payment, medical services, remote control, or the like. More specifically, examples of MTC services may include reading a meter, measuring a water level, utilizing a surveillance camera, inventory reporting of a vending machine, etc.

The MTC device is characterized in that a transmission data amount is small and uplink/downlink data transmission/reception occurs sometimes. Therefore, it is effective to decrease a unit cost of the MTC device and to decrease battery consumption according to a low data transmission rate. The MTC device is characterized by low mobility and thus has a channel environment that hardly changes.

Figure 10B:
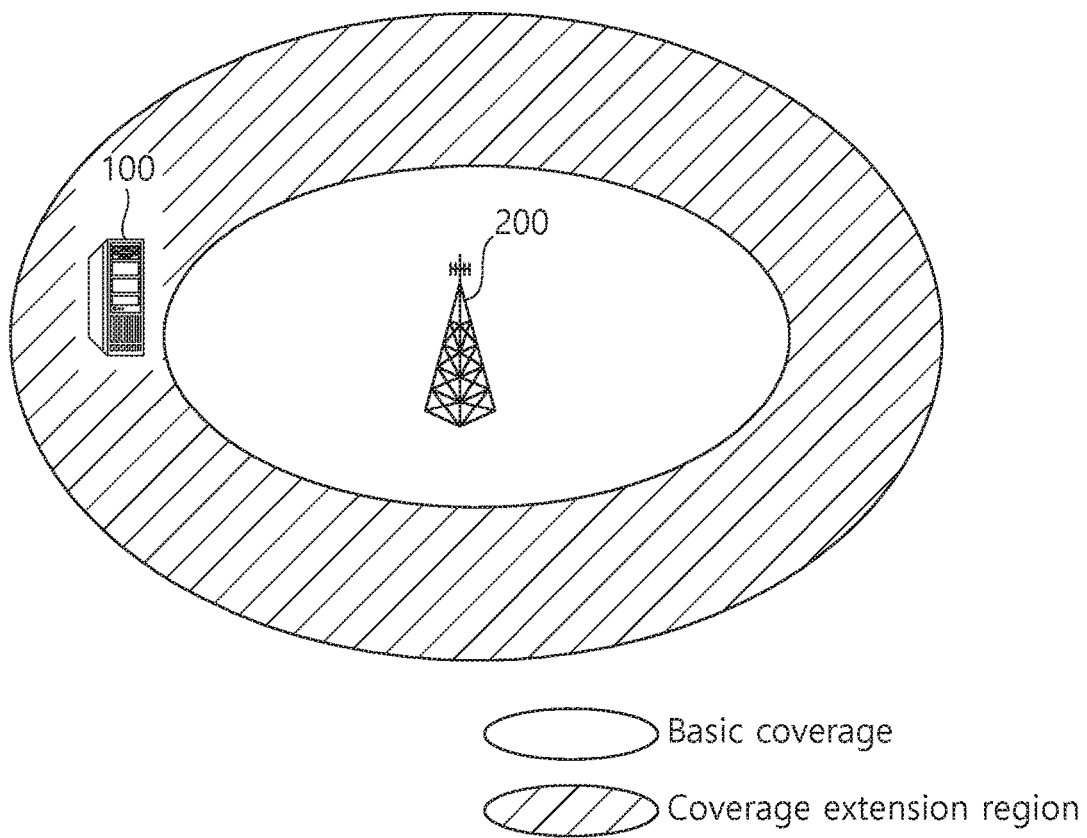
FIG. 10b illustrates an example of cell coverage extension for an MTC device.

FIG. 10b illustrates an example of cell coverage extension for an MTC device.

Recently, extension of cell coverage of a BS is considered for an MTC device 100, and various schemes for extending cell coverage are under discussion.

However, when the cell coverage is extended, if the BS transmits a PDSCH and a PDCCH including scheduling information on the PDSCH to an MTC device located in the coverage extension region as if transmitting the PDSCH and the PDCCH to a normal UE, the MTC device has difficulty in receiving the PDSCH and the PDCCH.

Likewise, when the MTC device located in the coverage extension region transmits a physical random access channel (PRACH or a PRACH preamble) to the BS in a usual way, the BS may have difficulty in receiving the PRACH transmitted from the MTC device.

Thus, a first embodiment of the present invention is provided to solve the foregoing problem.

According to the embodiment of the present invention, to solve the foregoing problem, when the MTC device 100 located in the coverage extension region transmits a PRACH to the BS, the MTC device 100 repeatedly transmits a plurality of preambles according to a specific repetition level. For example, when the MTC device 100 is located in a place where signal reception is poor (for example, in the cell coverage extension region), such as under a bridge or in a basement, the MTC device 100 may repeatedly transmit a random access preamble in the embodiment of the present invention. Likewise, the BS may repeatedly transmit an RAR (that is, Msg 2) to the random access preamble to the MTC device. Then, the MTC device 100 may repeatedly transmit a scheduled message (that is, Msg 3) based on the RAR. Further, the BS may also repeatedly transmit Msg 4. Meanwhile, when the MTC device 100 receives no RAR from the BS even though repeatedly transmitting the random access preamble or when the MTC device 100 receives no Msg 4 from the BS even though repeatedly transmitting Msg 3, it may be technically unclear whether the MTC device 100 needs to retransmit the random access preamble according to the same repetition level as the previous one or needs to change the repetition level to retransmit the random access preamble.

Thus, a second embodiment of the present invention is provided to solve even such a problem.

According to the second embodiment of the present invention, to solve the foregoing problem, when the BS does not properly receive a PRACH, the MTC device retransmits the PRACH by performing power ramping or changing the specific repetition level.

Hereinafter, embodiments of the present invention will sequentially be described with reference to drawings.

I. First Embodiment of the Present Invention

A method of performing a random access procedure according to the first embodiment of the present invention is a method of performing a random access procedure by an MTC device located in a coverage extension region, which may include generating a random access preamble to a specific cell and repeatedly transmitting the generated random access preamble according to a preset repetition level.

Figure 11:
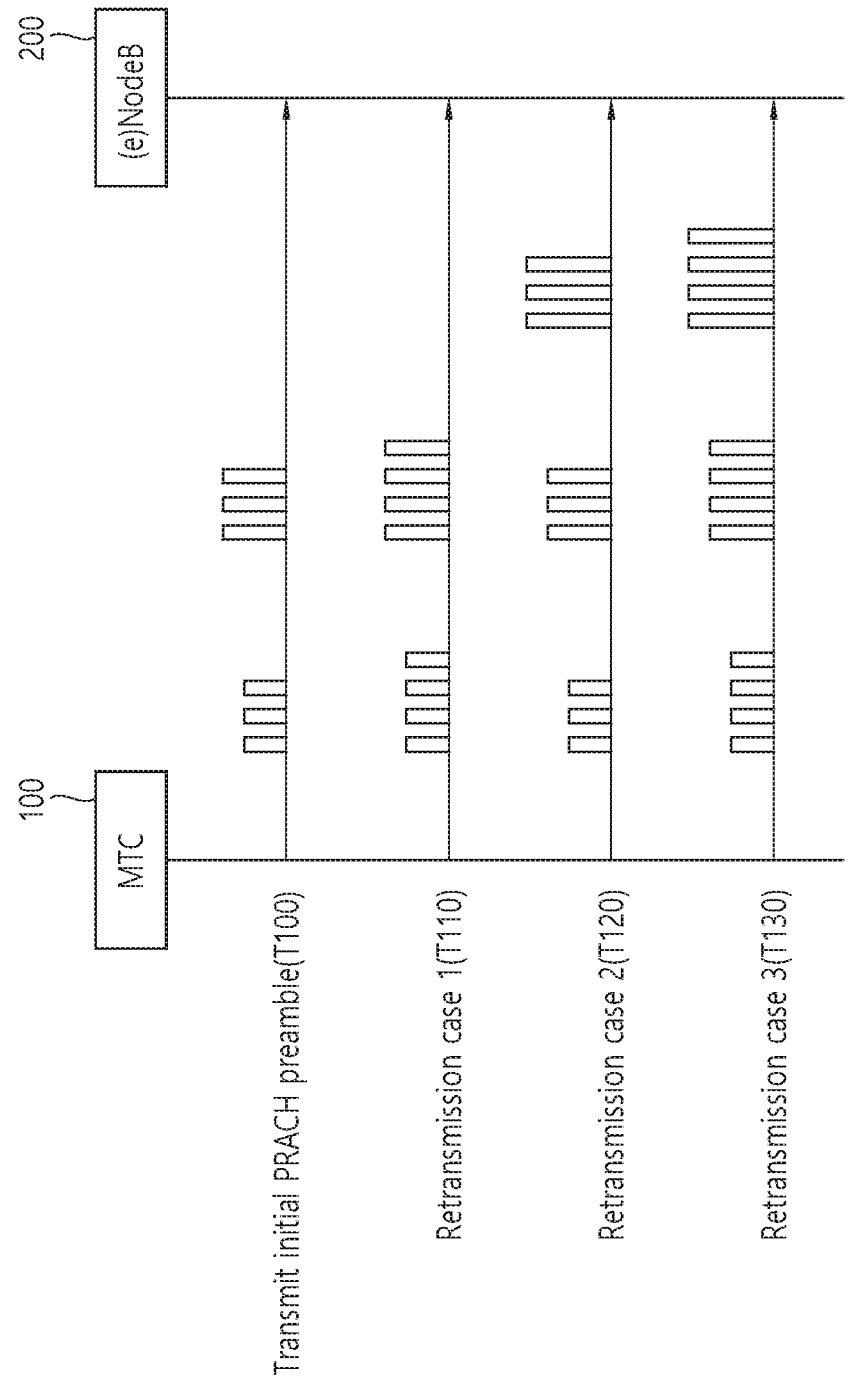
FIG. 11 illustrates a method of transmitting or retransmitting a PRACH according to an embodiment of the present invention.

FIG. 11 illustrates a method of transmitting or retransmitting a PRACH according to an embodiment of the present invention.

Referring to FIG. 11, an MTC device 100 according to the first embodiment of the present invention may transmit an initial PRACH preamble to an eNodeB according to a specific repetition level (T100).

For example, the specific repetition level may be 3 as illustrated in FIG. 3.

When the eNodeB does not properly receive the initial PRACH preamble, the MTC device 100 may retransmit the PRACH preamble.

Here, the MTC device 100 may change the specific repetition level or perform power ramping to retransmit the PRACH.

As illustrated in FIG. 11, retransmission case 1 (TI 10) shows that only the repetition level is changed (from 3 to 4) to retransmit the PRACH preamble, retransmission case 2 (T120) shows that only the number of power ramping times is changed (from 2 to 3) to retransmit the PRACH preamble, and retransmission case 3 (T130) shows that both the repetition level and the number of power ramping times are changed to retransmit the PRACH preamble.

The PRACH repetition level may be changed when retransmission of the PRACH preamble is performed due to failure of RAR reception after initial transmission or failure of Msg 4 reception during contention resolution.

In this case, increasing the repetition level may be considered along with power ramping for the PRACH.

Increasing the repetition level may denote increasing the number of PRACH repetition times in PRACH retransmission.

According to an illustrative scheme for performing power ramping and increasing the repetition level, it may be considered that the repetition level is increased after power ramping is performed to a certain level, or power ramping is performed after the repetition level is changed.

Further, it may be considered to perform power ramping or change the repetition level using current total PRACH power as a parameter.

The total PRACH power may denote total power for a plurality of subframes corresponding to the repeated PRACH.

In a scheme for increasing the repetition level after power ramping is performed to a certain level, the total number of (re)transmissions of the PRACH preamble may be configured according to first to third methods as follows.

In a first method, the total number of (re)transmissions of the PRACH preamble is expressed as a single parameter considering both power ramping and an increase in repetition level.

For example, parameter "preambleTransMax" denotes the total number of (re)transmissions of the PRACH preamble and may be configured in the MTC device through a higher-layer signal from the eNodeB.

Further, the number of power ramping times may be designated by each repetition level. For example, the number of power ramping times may be designated in advance or be configured in a high layer by each repetition level.

In a second method, the maximum number of power ramping times may be configured as a single parameter.

The parameter may be, for example, "preambleTransMax," and the total number of (re)transmissions of the PRACH preamble may actually be configured with "preambleTransMax" and a parameter representing a repetition level configured in the eNodeB according to an increase in repetition level.

For example, the total number of (re)transmissions of the PRACH preamble may be configured as "preambleTransMax*(# of repetition levels)."

Finally, in a third method, the maximum number of power ramping times may be configured by each repetition level.

A corresponding parameter may be expressed as preambleTransMax_m with respect to repetition level m, and the total number of (re)transmissions of the PRACH preamble may be expressed as the total maximum number of power ramping times with respect to repetition levels configured in the eNodeB.

II. Second Embodiment of the Present Invention

Meanwhile, PRACH retransmission may be performed in case A or case B as follows.

Case A is a case where an RAR to a PRACH is not received in a configured RAR window after initial transmission of the PRACH.

Case B is a case where a UE or the MTC device 100 does not receive Msg 4 until a contention resolution timer configured in contention resolution expires.

When retransmission of the PRACH preamble is performed in case A or case B, a PRACH repetition level may be configured the same or differently for case A and case B.

Thus, a PRACH repetition level configuration method according to a first aspect for case A (that is, where no RAR is received) and a PRACH repetition level configuration method according to a second aspect for case B (that is, where no Msg 4 is received) will be described hereinafter.

First Aspect of Second Embodiment of the Present Invention

A method of performing a random access procedure according to the first aspect is a method of performing a random access procedure for coverage enhancement, which may include repeatedly transmitting a random access preamble to a specific cell according to a preset repetition level, reconfiguring the repetition level when no RAR is received within an RAR window, and repeatedly retransmitting the random access preamble according to the reconfigured repetition level.

The reconfiguring the repetition level may reconfigure the repetition level based on a preset mode.

For example, the preset mode may be a mode of reconfiguring the repetition level to a possible lowest repetition level or a repetition level selected based on a measurement by the MTC device.

Alternatively, the preset mode may be a mode of increasing the preset repetition level by one.

Alternatively, the preset mode may be a mode of increasing the preset repetition level by one when preamble transmission power $P_{PRACH}$ is configured UE transmission power.

Alternatively, the preset mode may be a mode of increasing the preset repetition level by one when preamble transmission power $P_{PRACH}$ at a time of performing power ramping is configured UE transmission power or greater.

That is, the preset mode may be a mode of increasing the preset repetition level by one when transmission power for the random access preamble reaches maximum transmission power configured in the MTC device or the preamble transmission power at the time of performing power ramping is the maximum transmission power or greater.

Alternatively, the preset mode may be a mode of reconfiguring the repetition level based on total PRACH power, in which the total PRACH power may be total power for subframes corresponding to the repeatedly transmitted random access preamble.

Alternatively, the preset mode may be a mode of reconfiguring the repetition level according to repetition level information included in a PDCCH order when the random access procedure starts according to the PDCCH order.

Figure 12:
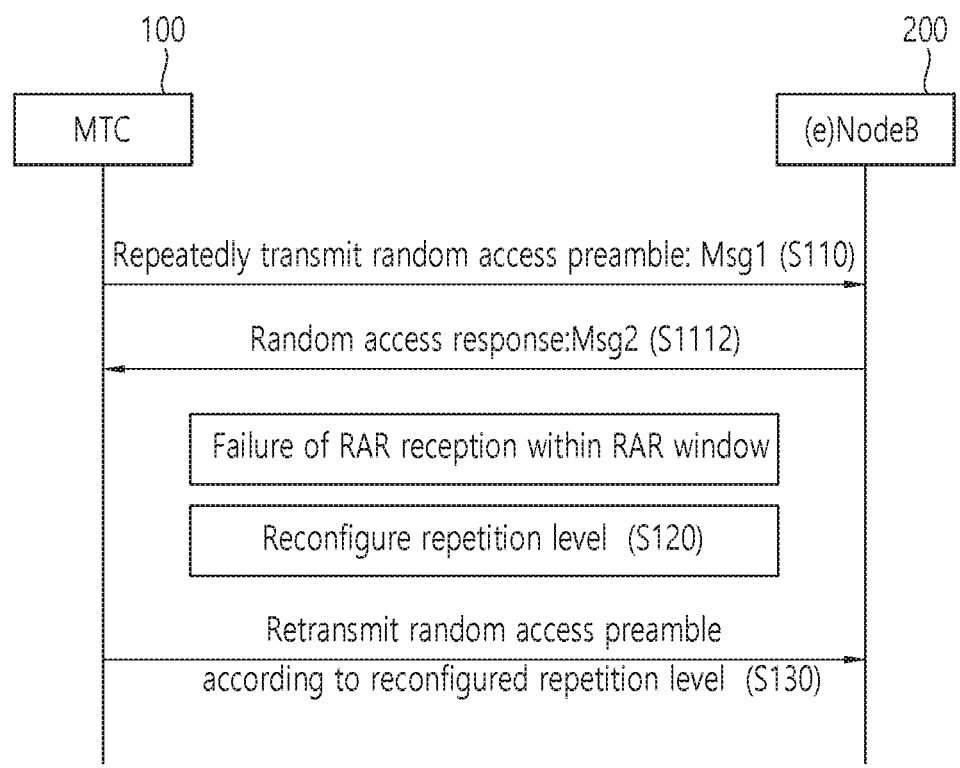
FIG. 12 illustrates a random access procedure in case A according to a first embodiment of the present invention.

FIG. 12 illustrates an example of the random access procedure in case A according to the first aspect.

In the random access procedure according to the first embodiment of the present invention illustrated in FIG. 12, an MTC device 100 may repeatedly transmit a random access preamble (Msg 1) to a specific cell according to a preset repetition level (S110).

Next, an eNodeB 200 may transmit an RAR (Msg 2) to the random access preamble to the MTC device 100 (S1112).

When the MTC device 100 does not properly receive the RAR within an RAR window (case A: failure of RAR reception within RAR window), the MTC device 100 may reconfigure the repetition level (S120).

Here, the MTC device 100 may reconfigure the repetition level based on a preset mode.

Next, the MTC device 100 may repeatedly retransmit the random access preamble according to the reconfigured repetition level (S130).

In case A, the preset mode may be one of the following modes.

Mode A-1

Mode A-1 may be a mode of changing a PRACH repetition level for retransmission based on a repetition level of an initially transmitted PRACH. That is, mode A-1 may be a mode of configuring the repetition level to be an initial repetition level.

The initial repetition level may be a lowest repetition level or a repetition level selected based on a measurement by a UE or the MTC device 100.

That is, the preset mode may be a mode of reconfiguring the repetition level to a possible lowest repetition level or a repetition level selected based on a measurement by the MTC device.

Mode A-2

Mode A-2 may be a mode of simply increasing a repetition level for retransmitting a PRACH preamble.

For example, the MTC device 100 may increase a PRACH repetition level for retransmission by one.

That is, mode A-2 may be a mode of increasing the preset repetition level by one.

Mode A-3

Mode A-3 may be a mode of configuring a repetition level in view of PRACH power.

For example, the MTC device 100 may increase the repetition level by one when power for a previous PRACH is $P_{CMAX,c}(i)$, while the MTC device 100 may maintain the repetition level otherwise.

That is, the MTC device 100 may increase the preset repetition level by one when preamble transmission power $P_{PRACH}$ is configured UE transmission power.

Alternatively, the MTC device 100 may increase the repetition level by one when PRACH power at power ramping at the power for the previous PRACH is $P_{CMAX,c}(i)$ or greater, while the MTC device 100 may maintain the repetition level otherwise.

That is, the MTC device 100 may increase the preset repetition level by one when preamble transmission power $P_{PRACH}$ at a time of performing power ramping is configured UE transmission power or greater.

That is, the preset mode may be a mode of increasing the preset repetition level by one when transmission power for the random access preamble reaches maximum transmission power configured in the MTC device or the preamble transmission power at the time of performing power ramping is the maximum transmission power or greater.

Alternatively, the MTC device 100 may determine whether to perform power ramping or to change a repetition value in view of total power for a repeated PRACH.

The total power may be a value obtained by adding up power per subframe with respect to subframes corresponding to the repeated PRACH.

That is, mode A-3 may be a mode of reconfiguring the repetition level based on total PRACH power, in which the total PRACH power may be total power for subframes corresponding to the repeatedly transmitted random access preamble.

In this case, the MTC device 100 may select one involving smaller total RACH power of power ramping at the power for the previous PRACH and a change of the repetition level.

That is, mode A-3 may be a mode of selecting and performing one involving smaller total RACH power of power ramping and a change of the preset repetition level, in which the total PRACH power may be total power for subframes corresponding to the repeatedly transmitted random access preamble.

Mode A-4

Mode A-4 may be a mode of configuring a PRACH repetition level according to repetition level information included in a PDCCH order when a PRACH is configured according to the PDCCH order.

That is, mode A-4 may be a mode of reconfiguring a repetition level according to repetition level information included in a PDCCH order when a random access procedure starts according to the PDCCH order.

Second Aspect of Second Embodiment of the Present Invention

A method of performing a random access procedure according to the second aspect is a method of performing a random access procedure for coverage enhancement, which may include generating a random access preamble to a specific cell, repeatedly transmitting the random access preamble according to a preset repetition level, transmitting a scheduled message (or message 3: Msg 3) when an RAR is received, reconfiguring the preset repetition level when no message 4 (Msg 4) is received until a contention resolution timer expires, and repeatedly retransmitting the random access preamble according to the reconfigured repetition level.

The reconfiguring the preset repetition level may reconfigure the preset repetition level based on an additional preset mode.

For example, the additional preset mode may be a mode of maintaining the preset repetition level in a case where the received RAR includes a backoff indicator, and increasing the preset repetition level in a case where the received RAR includes no backoff indicator.

Alternatively, the additional preset mode may be a mode of configuring the preset repetition level to be a repetition level corresponding to the scheduled message, in which the repetition level corresponding to the scheduled message may be one of a possible lowest repetition level, a repetition level selected based on a measurement by the MTC device, and a repetition level corresponding to a random access preamble successfully transmitted through retransmission before the scheduled message.

Alternatively, the received RAR includes a repetition level field, and the additional preset mode may be a mode of reconfiguring the preset repetition level according to the repetition level field.

Alternatively, the additional preset mode may be a mode of selecting and performing one involving smaller total RACH power of power ramping and a change of the preset repetition level, in which the total PRACH power may be total power for subframes corresponding to the repeatedly transmitted random access preamble.

Alternatively, the additional preset mode may be a mode of reconfiguring the preset repetition level according to repetition level information included in a PDCCH order when the random access procedure starts according to the PDCCH order.

Figure 13:
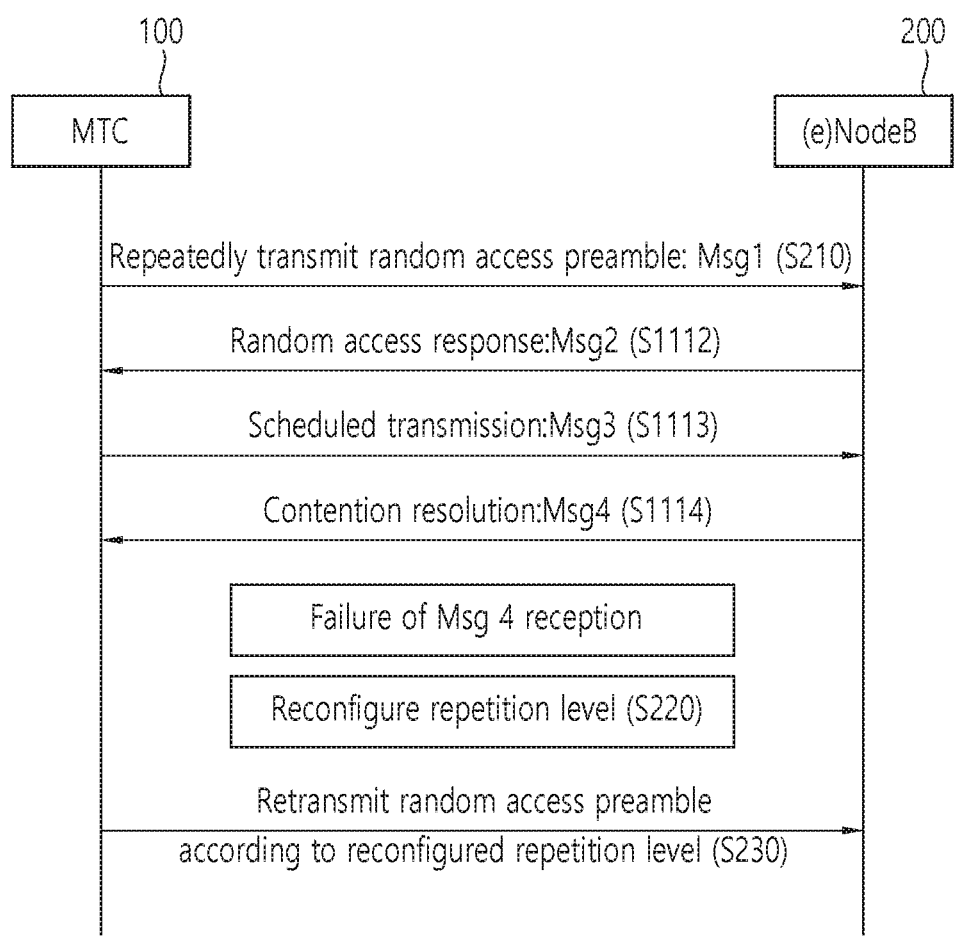
FIG. 13 illustrates a random access procedure in case B according to a second embodiment of the present invention.

FIG. 13 illustrates an example of the random access procedure in case B according to the second aspect.

In the random access procedure according to the second aspect of the present invention illustrated in FIG. 13, an MTC device 100 may repeatedly transmit a random access preamble (Msg 1) to a specific cell according to a preset repetition level (S210).

Next, an eNodeB 200 may transmit an RAR (Msg 2) to the random access preamble to the MTC device 100 (S1112).

When an RAR valid for the MTC device 100 is received, the MTC device 100 processes information included in the RAR and performs scheduled transmission to the eNodeB 200 (S1113).

The MTC device 100 transmits data including an ID of the MTC device 100 through a UL grant assigned via the received RAR and waits for an instruction from the eNodeB 200 to avoid contention (S1114).

When the MTC device 100 does not properly receive Msg 4 until a contention resolution timer expires (case B: failure of Msg 4 reception), the MTC device 100 may reconfigure the repetition level (S220).

Here, the MTC device 100 may reconfigure the repetition level based on an additional preset mode.

Next, the MTC device 100 may repeatedly retransmit the random access preamble according to the reconfigured repetition level (S230).

In case B, the additional preset mode may be one of the following modes.

Mode B-1

Mode B-1 may be a mode of configuring a PRACH repetition level depending on the presence of a subheader of a backoff indicator in an RAR.

For example, the MTC device 100 may increase the PRACH repetition level in the absence of the backoff indicator subheader in the RAR, and maintain the PRACH repetition level in the presence of the backoff indicator subheader in the RAR.

That is, mode B-1 may be a mode of maintaining the preset repetition level in a case where the received RAR includes a backoff indicator, and increasing the preset repetition level in a case where the received RAR includes no backoff indicator.

Mode B-2

Mode B-2 may be a mode of changing a PRACH repetition level based on a repetition level of an initially transmitted PRACH. That is, mode A-1 may be a mode of configuring the repetition level to be an initial repetition level.

The initial repetition level may be a lowest repetition level or a repetition level selected based on a measurement by a UE or the MTC device 100.

That is, the additional preset mode may be a mode of reconfiguring the repetition level to a possible lowest repetition level or a repetition level selected based on a measurement by the MTC device.

Mode B-3

Mode B-3 may be a mode of configuring a PRACH repetition level corresponding to a scheduled message (Msg 3) as a PRACH repetition level for retransmission.

The PRACH repetition level corresponding to the scheduled message may be a repetition level used for initial transmission or a repetition level corresponding to a PRACH successfully transmitted through retransmission before the scheduled message is transmitted.

That is, mode B-3 may be a mode of configuring the preset repetition level to be a repetition level corresponding to the scheduled message, in which the repetition level corresponding to the scheduled message may be one of a possible lowest repetition level, a repetition level selected based on a measurement by the MTC device, and a repetition level corresponding to a random access preamble successfully transmitted through retransmission before the scheduled message.

Mode B-4

Mode B-4 may be a mode of configuring a PRACH repetition level for retransmission using a repetition level field, which is included in an RAR.

That is, according to mode B-4, the received RAR includes a repetition level field, and the additional preset mode may be a mode of reconfiguring the preset repetition level according to the repetition level field.

Mode B-5

Mode B-5 may be a mode of simply increasing a repetition level for retransmitting a PRACH preamble.

For example, the MTC device 100 may increase a PRACH repetition level for retransmission by one.

That is, mode B-5 may be a mode of increasing the preset repetition level by one.

Mode B-6

Mode B-6 may be a mode of maintaining a repetition level for retransmitting a PRACH preamble.

Mode B-7

Mode B-7 may be a mode of configuring a repetition level in view of PRACH power

For example, the MTC device 100 may increase the repetition level by one when power for a previous PRACH is $P_{CMAX,c}(i)$, while the MTC device 100 may maintain the repetition level otherwise.

That is, the MTC device 100 may increase the preset repetition level by one when preamble transmission power $P_{PRACH}$ is configured UE transmission power.

Alternatively, the MTC device 100 may increase the repetition level by one when PRACH power at power ramping at the power for the previous PRACH is $P_{CMAX,c}(i)$ or greater, while the MTC device 100 may maintain the repetition level otherwise.

That is, the MTC device 100 may increase the preset repetition level by one when preamble transmission power $P_{PRACH}$ at a time of performing power ramping is configured UE transmission power or greater.

That is, the additional preset mode may be a mode of increasing the preset repetition level by one when transmission power for the random access preamble reaches maximum transmission power configured in the MTC device or the preamble transmission power at the time of performing power ramping is the maximum transmission power or greater. Alternatively, the MTC device 100 may determine whether to perform power ramping or to change a repetition value in view of total power for a repeated PRACH.

The total power may be a value obtained by adding up power per subframe with respect to subframes corresponding to the repeated PRACH.

That is, mode B-7 may be a mode of reconfiguring the repetition level based on total PRACH power, in which the total PRACH power may be total power for subframes corresponding to the repeatedly transmitted random access preamble.

In this case, the MTC device 100 may select one involving smaller total RACH power of power ramping at the power for the previous PRACH and a change of the repetition level.

That is, mode B-7 may be a mode of selecting and performing one involving smaller total RACH power of power ramping and a change of the preset repetition level, in which the total PRACH power may be total power for subframes corresponding to the repeatedly transmitted random access preamble.

Mode B-8

Mode B-8 may be a mode of configuring a PRACH repetition level according to repetition level information included in a PDCCH order when a PRACH is configured according to the PDCCH order.

That is, mode B-8 may be a mode of reconfiguring a repetition level according to repetition level information included in a PDCCH order when a random access procedure starts according to the PDCCH order.

III. Additional Embodiments of the Present Invention

Configuration of Backoff Delay

Hereinafter, a method of configuring a backoff delay in accordance with a repetition level according to an additional embodiment of the present invention will be described.

In the existing 3GPP LTE Rel-10 system, a backoff delay parameter may be included in an RAR. When no backoff delay parameter is included in the RAR, a backoff delay value may be set to 0 for a UE or MTC device 100.

Also, a backoff delay value may be set to 0 for a PRACH according to a PDCCH order.

When the RAR includes the backoff delay parameter, a backoff delay is configured with the backoff delay parameter.

When the UE or MTC device 100, which receives no Msg4 until expiration of a contention resolution timer in a contention resolution process, retransmits a PRACH, the UE or MTC device 100 may select a random value from 0 to the backoff delay parameter as a backoff delay and retransmit the PRACH after a delay of the backoff delay value.

Although a PRACH occupies up to three subframes conventionally, a PRACH may occupy a greater number of subframes in view of repetition of the PRACH. In this case, a conventional backoff delay configuration method may be less effective in preventing possible contention between repeatedly transmitted PRACHs and thus needs to be efficiently changed.

That is, it may be a quite suitable method to set a repetition level as a parameter in configuring a backoff delay.

For example, when the UE or MTC device 100 selects a random value from 0 to the backoff delay parameter as a backoff delay value, a final backoff delay value may be determined by modifying the selected random value according to a repetition level.

In detail, the final backoff delay value may be determined by multiplying the random value by the number of repetition times.

Alternatively, the final backoff delay value may be determined by multiplying a preset correction value by repetition level by the random value or adding the preset correction value to the random value.

Configuration of PRACH Repetition Level in Handover

Hereinafter, a method of configuring a PRACH repetition level in handover according to an additional embodiment of the present invention will be described.

An MTC device 100 may support mobility.

In this case, the MTC device 100 may be handed over from a current serving cell or source cell to a target cell.

The MTC device 100 may need to synchronize to UL timing so that the MTC device 100 accesses the target cell to receive UE-specific DL channels or to transmit UL channels.

In this case, a higher layer may notify the MTC device 100 of a repetition level for transmission of a PRACH preamble to the target cell during handover, thus configuring a repetition level suitable for retransmission of the PRACH preamble.

Alternatively, the MTC device 100 may be provided with SFN offset information against an SFN for the target cell or an SFN for the source cell during handover.

Alternatively, it may be assumed that the SFN for the target cell and the SFN for the source cell are the same in handover of the MTC device 100.

Here, the SFNs being the same may mean that when radio frames of the same SFNs for the two cells overlap more than half, a time difference between frames i of the two cells may be interpreted as being within 153600·Ts. Such interpretation may be possible since operations of the MTC device 100 including random access and (E)PDCCH repetition are performed using an SFN as a parameter.

Figure 14:
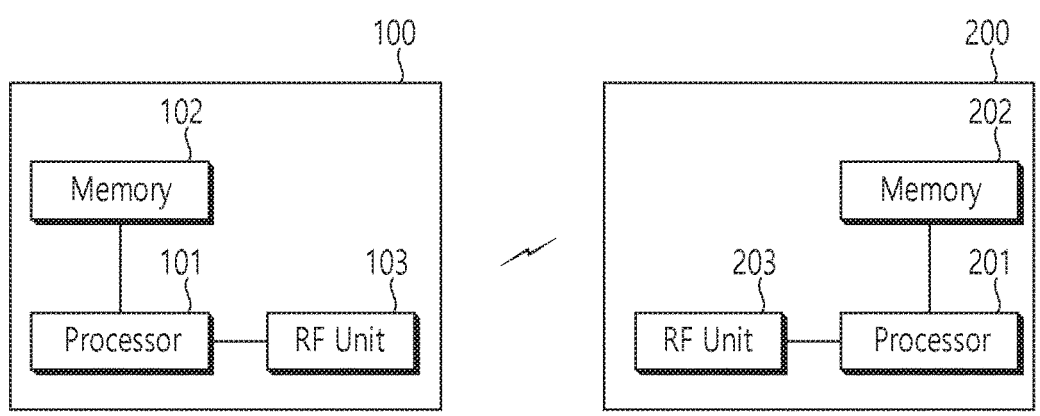
FIG. 14 is a block diagram illustrating a wireless communication system according to an embodiment of the present invention.

The aforementioned embodiments of the present invention can be implemented through various means. For example, the embodiments of the present invention can be implemented in hardware, firmware, software, combinations thereof, etc. Details thereof will be described with reference to the drawing FIG. 14 is a block diagram of a wireless communication system according to an embodiment of the present invention.

A BS 200 includes a processor 201, a memory 202, and a radio frequency (RF) unit 203. The memory 202 is coupled to the processor 201, and stores a variety of information for driving the processor 201. The RF unit 203 is coupled to the processor 201, and transmits and/or receives a radio signal. The processor 201 implements the proposed functions, procedures, and/or methods. In the aforementioned embodiment, an operation of the BS may be implemented by the processor 201.

An MTC device 100 includes a processor 101, a memory 102, and an RF unit 103. The memory 102 is coupled to the processor 101, and stores a variety of information for driving the processor 101. The RF unit 103 is coupled to the processor 101, and transmits and/or receives a radio signal. The processor 101 implements the proposed functions, procedures, and/or methods.

The processor may include Application-specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

An MTC device according to one embodiment of the present invention is an MTC device performing a random access procedure for coverage enhancement, which may include a transceiver to repeatedly transmit a random access preamble to a specific cell according to a preset repetition level, and a processor to reconfigure the repetition level when no RAR is received within an RAR window and to control the transceiver to repeatedly retransmit the random access preamble according to the reconfigured repetition level.

The transceiver may transmit message 3 (Msg 3) when an RAR is received, and the processor may reconfigure the preset repetition level when no message 4 (Msg 4) is received until a contention resolution timer expires, and control the transceiver to repeatedly retransmit the random access preamble according to the reconfigured repetition level.

Here, the transceiver may correspond to the RF unit 103 or be configured to include the RF unit 103.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

As described above, the embodiments of the present invention solve the foregoing problems of the conventional technology. More specifically, the embodiments of the present invention may improve reception performance and decoding performance of an MTC device located in a coverage extension region of an eNodeB with respect to the eNodeB, thereby implementing a random access procedure in an efficient and excellent manner.

What is claimed is:

1. A method of performing a random access procedure, the method performed by a wireless device located in a coverage extension region of a long term evolution (LTE) based cell and comprising:
repeatedly transmitting a random access preamble according to a first repetition level to a cell;
if a random access response (RAR) including a random access preamble identifier corresponding to the transmitted random access preamble is not received from the cell, performing a repetition level change from the first repetition level to a second repetition level and performing a power ramping;
repeatedly retransmitting the random access preamble according to the second repetition level,
wherein the random access preamble is repeatedly transmitted and retransmitted on a plurality of subframes, and
wherein the repetition level change is performed firstly and then the power ramping is performed, such that the power ramping is performed if the RAR including the random access preamble identifier is not received and if the retransmission based on the repetition level change is performed;
transmitting a scheduled message when the RAR is received; and
if a message in response to the scheduled message is not received until a contention resolution timer expires, repeatedly retransmitting the random access preamble.

2. The method of claim 1, wherein the second repetition level is higher than the first repetition level by one, and
wherein information on the first and second the repetition levels is received via a higher layer signal.

3. The method of claim 1, wherein the power ramping is performed until reaching a maximum transmission power configured in the wireless device.

4. The method of claim 1, wherein the repetition level change is performed based on total physical random access channel (PRACH) power, and
wherein the total PRACH power corresponds to a summation of power on subframes where the random access preamble is repeatedly transmitted.

5. The method of claim 1, wherein the first repetition level change from the first repetition level to the second repetition level is performed based on an additional preset mode.

6. The method of claim 5, wherein the additional preset mode is one of a first mode of maintaining the first repetition level when the RAR comprises a backoff indicator, and a second mode of performing the change from the first repetition level to the second repetition level when the RAR comprises no backoff indicator.

7. The method of claim 1, wherein the RAR is repeatedly transmitted from the cell.

8. The method of claim 1, wherein if the random access preamble is transmitted by a physical downlink control channel (PDCCH) order, the PDCCH order includes information regarding the first repetition level.

9. A wireless device located in a coverage extension region of a long term evolution (LTE) based cell to perform a random access procedure for coverage enhancement, the wireless device comprising:
a transceiver to repeatedly transmit a random access preamble to a cell according to a first repetition level; and
a processor to:
perform a repetition level change from the first repetition level to a second repetition level and perform a power ramping, if a random access response (RAR) including a random access preamble identifier corresponding to the transmitted random access preamble is not received from the cell,
control the transceiver to repeatedly retransmit the random access preamble according to the second repetition level,
wherein the random access preamble is repeatedly transmitted and retransmitted on a plurality of subframes, and
wherein the repetition level change is performed firstly and then the power ramping is performed, such that the power ramping is performed if the RAR including the random access preamble identifier is not received and if the retransmission based on the repetition level change is performed,
control the transceiver to transmit a scheduled message when the RAR is received, and
if a message in response to the scheduled message is not received until a contention resolution timer expires, control the transceiver to repeatedly retransmit the random access preamble.

10. The wireless device of claim 9, wherein the second repetition level is higher than the first repetition level by one, and
wherein information on the first and second the repetition levels is received via a higher layer signal.

11. The wireless device of claim 9, wherein the RAR is repeatedly transmitted from the cell.

12. The wireless device of claim 9, wherein if the random access preamble is transmitted by a physical downlink control channel (PDCCH) order, the PDCCH order includes information regarding the first repetition level.

* * * * *